United States Patent
Sivanath et al.

(10) Patent No.: US 12,030,184 B2
(45) Date of Patent: Jul. 9, 2024

(54) SYSTEM AND METHOD FOR ERROR CORRECTION AND COMPENSATION FOR 3D EYE-TO-HAND COORDINATION

(71) Applicant: eBots inc., Fremont, CA (US)

(72) Inventors: Sabarish Kuduwa Sivanath, San Jose, CA (US); Zheng Xu, Pleasanton, CA (US)

(73) Assignee: eBots Inc., Fremont, CA (US)

( * ) Notice: Subject to any disclaimer, the term of this patent is extended or adjusted under 35 U.S.C. 154(b) by 241 days.

(21) Appl. No.: 17/751,228

(22) Filed: May 23, 2022

(65) Prior Publication Data
US 2022/0402131 A1  Dec. 22, 2022

Related U.S. Application Data

(60) Provisional application No. 63/209,933, filed on Jun. 11, 2021, provisional application No. 63/208,816, filed on Jun. 9, 2021.

(51) Int. Cl.
*G06F 17/00* (2019.01)
*B25J 9/16* (2006.01)
*B25J 19/02* (2006.01)

(52) U.S. Cl.
CPC .......... *B25J 9/1653* (2013.01); *B25J 9/161* (2013.01); *B25J 9/163* (2013.01); *B25J 9/1687* (2013.01); *B25J 9/1692* (2013.01); *B25J 19/023* (2013.01)

(58) Field of Classification Search
CPC . B25J 9/1653; B25J 9/161; B25J 9/163; B25J 9/1687; B25J 9/1692; B25J 19/023; B25J 9/1697; G05B 2219/39008
(Continued)

(56) References Cited

U.S. PATENT DOCUMENTS 9,616,573 B2 *  4/2017  Kawamura ............ B25J 9/1697
2021/0387350 A1 * 12/2021  Oleynik ................. A47J 44/00
(Continued)

FOREIGN PATENT DOCUMENTS

CN     1033590 A  *  7/1989  ............ B25J 9/1692
CN   105773622 B  *  4/2019  ............ B25J 9/1602
(Continued)

OTHER PUBLICATIONS

Positioning error compensation of an industrial robot using neural networks and experimental study (2021).*

*Primary Examiner* — Ronnie M Mancho
(74) *Attorney, Agent, or Firm* — Shun Yao; Yao Legal Services, Inc.

(57) ABSTRACT

One embodiment can provide a robotic system. The system can include a machine-vision module, a robotic arm comprising an end-effector, a robotic controller configured to control movements of the robotic arm, and an error-compensation module configured to compensate for pose errors of the robotic arm by determining a controller-desired pose corresponding to a camera-instructed pose of the end-effector such that, when the robotic controller controls the movements of the robotic arm based on the controller-desired pose, the end-effector achieves, as observed by the machine-vision module, the camera-instructed pose. The error-compensation module can include a machine learning model configured to output an error matrix that correlates the camera-instructed pose to the controller-desired pose.

22 Claims, 8 Drawing Sheets

(58) Field of Classification Search
USPC .......................................................... 700/254
See application file for complete search history.

(56) References Cited

U.S. PATENT DOCUMENTS

| | | | |
|---|---|---|---|
| 2022/0395981 A1* | 12/2022 | Xu .......................... | B25J 9/1664 |
| 2023/0123629 A1* | 4/2023 | Xu .......................... | B25J 9/1602 |
| | | | 700/251 |
| 2023/0339118 A1* | 10/2023 | Xu .......................... | G06T 7/10 |

FOREIGN PATENT DOCUMENTS

| CN | 111203890 A | * | 5/2020 | .............. B25J 9/161 |
| CN | 112518753 B | * | 2/2022 | ......... B23K 37/0247 |
| CN | 115519536 A | * | 12/2022 | ............ B25J 19/023 |
| CN | 115972192 A | * | 4/2023 | .............. B25J 13/08 |
| EP | 4116043 A2 | * | 1/2023 | ............ B25J 9/1692 |
| JP | 6307431 B2 | * | 4/2018 | ............ B25J 9/1697 |

* cited by examiner

SYSTEM AND METHOD FOR ERROR CORRECTION AND COMPENSATION FOR 3D EYE-TO-HAND COORDINATION

RELATED APPLICATION

This claims the benefit of U.S. Provisional Patent Application No. 63/208,816, entitled "SYSTEM AND METHOD FOR CORRECTING AND COMPENSATING ERRORS OF 3D EYE-TO-HAND COORDINATION," filed 9 Jun. 2021, and U.S. Provisional Patent Application No. 63/209,933, entitled "SYSTEM AND METHOD FOR IMPROVING ACCURACY OF 3D EYE-TO-HAND COORDINATION OF A ROBOTIC SYSTEM," filed 11 Jun. 2021, the disclosures of which are incorporated herein by reference in their entirety for all purposes.

BACKGROUND

Field

This disclosure is generally related to a computer vision system for robotic applications. Particularly, this invention relates to a system and method for error correction and compensation for 3D eye-to-hand coordination of a robotic system by training a neural network to derive an error matrix.

Related Art

Robots have been widely employed and exploited in modern industrial plants, representing particularly important elements in the production flow. The requirements for more flexibility and rapid reconfigurability have driven the advancement of robotic technologies. Positional accuracy and repeatability of industrial robots are fundamental attributes needed to achieve the automatization of flexible manufacturing tasks. The positional accuracy and repeatability of robots can vary significantly within the robot workspace, and vision guided robotic systems have been introduced to improve the flexibility and accuracy of the robots. Extensive work has been done to improve the accuracy of the machine-vision system with regard to the robotic end-effectors, so-called eye-to-hand coordination. Achieving highly accurate eye-to-hand coordination is a daunting task, particularly in a three-dimensional (3D) space.
Positioning/movement errors from robotic arms and end-effectors, measurement errors of the 3D vision, and errors contained in the calibration target can all contribute to overall system errors, limiting the operating accuracy of the robotic system. It can be challenging for a 6-axis robot to achieve sub-millimeter accuracy in its entire working space.

SUMMARY

One embodiment can provide a robotic system. The system can include a machine-vision module, a robotic arm comprising an end-effector, a robotic controller configured to control movements of the robotic arm, and an error-compensation module configured to compensate for pose errors of the robotic arm by determining a controller-desired pose corresponding to a camera-instructed pose of the end-effector such that, when the robotic controller controls the movements of the robotic arm based on the controller-desired pose, the end-effector achieves, as observed by the machine-vision module, the camera-instructed pose. The error-compensation module can include a machine learning model configured to output an error matrix that correlates the camera-instructed pose to the controller-desired pose.

In a variation on this embodiment, the machine learning model can include a neural network.

In a further variation, the neural network can include an embedding layer and a processing layer, and each of the embedding and processing layers can include a multi-layered perceptron.

In a further variation, the embedding layer can be configured to embed separate translational components and rotational components of a pose.

In a further variation, the embedding layer can use Rectified Linear Unit (ReLU) as an activation function, and the processing layer can use leaky ReLU as an activation function.

In a further variation, the system can further include a model-training module configured to train the neural network by collecting training samples. While training the neural network, the model-training module is configured to: cause the robotic controller to generate a controller-desired pose sample; control movements of the robotic arm based on the controller-desired pose sample; determine, using a machine-vision module, an actual pose of the end-effector; and compute an error matrix based on the controller-desired pose sample and the actual pose.

In further variation, the model-training module can be configured to train the neural network until the error matrix produced by the machine learning model reaches a predetermined level of accuracy.

In a variation on this embodiment, the system can further include a coordinate-transformation module configured to transform a pose determined by the machine-vision module from a camera-centered coordinate system to a robot-centered coordinate system.

In further variation, the coordinate-transformation module can be further configured to determine a transformation matrix based on a predetermined number of measured poses of a calibration target.

In further variation, the coordinate-transformation module can be further configured to correlate a pose of a component held by the end-effector to a corresponding pose of the end-effector.

One embodiment can provide a computer-implemented method. The method can include determining, by a machine-vision module, a camera-instructed pose of an end-effector of a robotic arm for accomplishing an assembly task; determining, by a robotic controller, a controller-desired pose corresponding to the camera-instructed pose of the end-effector, which comprises applying a machine learning model to obtain an error matrix that correlates the camera-instructed pose to the controller-desired pose; and controlling movements of the robotic arm based on the controller-desired pose, thereby facilitating the end-effector to achieve the camera-instructed pose in order to accomplish the assembly task.

One embodiment can provide a computer-implemented method. The method can include modeling pose errors associated with an end-effector of a robotic arm using a neural network; training the neural network using a plurality of training samples, a respective training sample comprising a camera-instructed pose of the end-effector and a corresponding error matrix that correlates the camera-instructed pose to a controller-desired pose of the end-effector; and applying the trained neural network to compensate for the pose errors during operations of the robotic arm.

BRIEF DESCRIPTION OF THE FIGURES

In the figures, like reference numerals refer to the same figure elements.

DETAILED DESCRIPTION

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein solve the technical problem of correcting pose errors of robotic systems. More specifically, a machine learning model (e.g., a neural network) can be trained to learn the error matrix characterizing the pose error of a robotic arm at each position within the working space of the robotic arm. Training the machine learning model can include a supervised training process. During training, the gripper of the robotic arm can be moved and placed into a predetermined pose, and the actual pose of the gripper can be measured using a 3D machine-vision system. An error matrix can be derived based on the difference between the predetermined pose and the measured pose. Once sufficiently trained, the machine learning model can infer the error matrix corresponding to any pose within the workspace. During operation, possible pose errors of the gripper can be compensated in real time based on the inferred error matrix.

The Error Matrix

Figure 1:
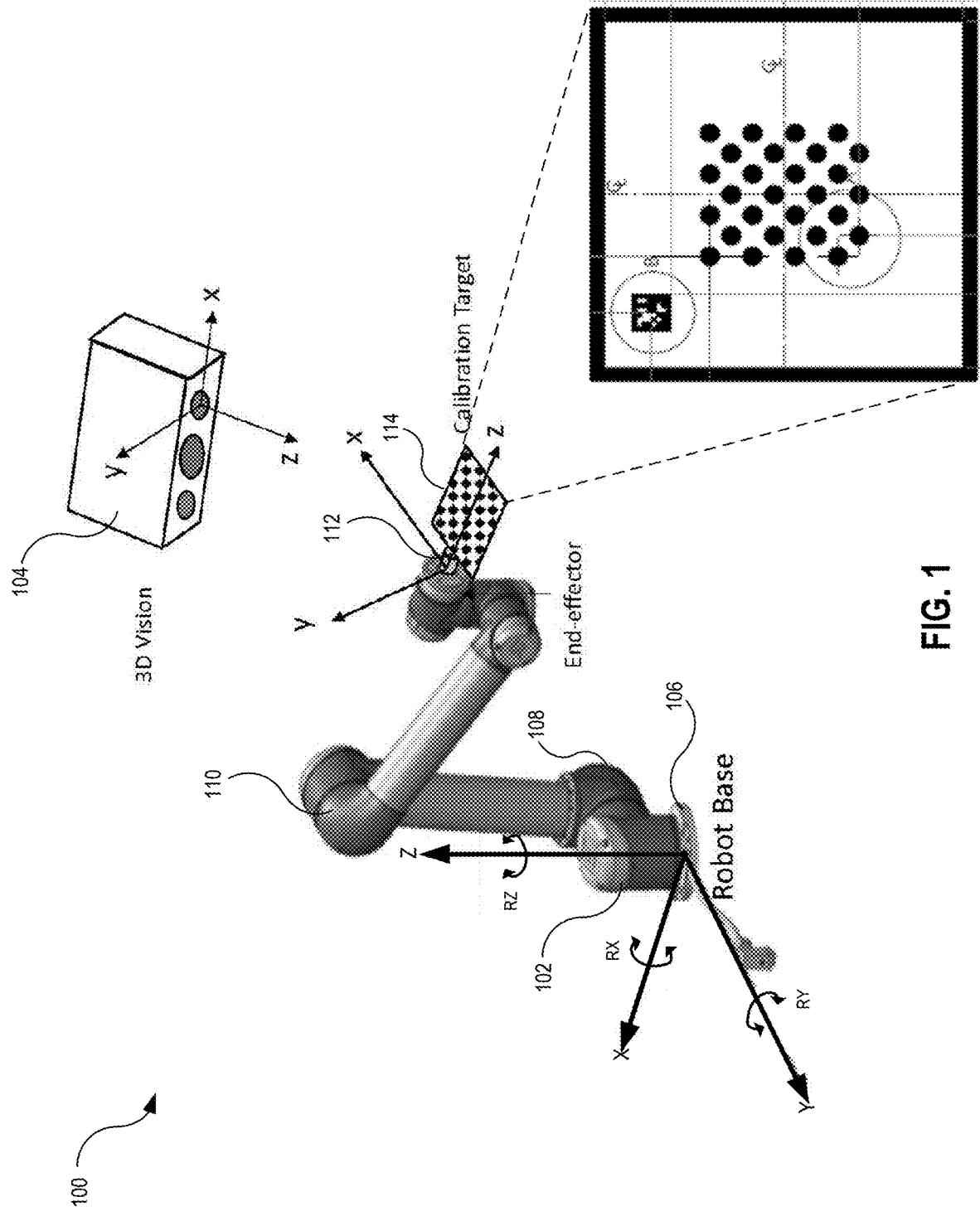
FIG. 1 illustrates an exemplary robotic system, according to one embodiment.

FIG. 1 illustrates an exemplary robotic system, according to one embodiment. Robotic system 100 can include a robotic arm 102 and a 3D machine-vision module 104. In some embodiments, robotic arm 102 can include a base 106, multiple joints (e.g., joints 108 and 110) and a gripper 112. The combination of the multiple joints can enable robotic arm 102 to have an extensive range of movement and have six degrees of freedom (6DoF). FIG. 1 shows the Cartesian coordinate system (e.g., X-Y-Z) used by the robotic controller to control the pose of robotic arm 102. This coordinate system is referred to as the robot-base coordinate system. In the example shown in FIG. 1, the origin of the robot-base coordinate system is at robotic base 106, so this coordinate system is also referred to as robot-centered coordinate system.

FIG. 1 also shows that 3D machine-vision module 104 (which may include multiple cameras) is configured to capture images of robotic arm 102, including images of a calibration target 114 held by gripper 112. Calibration target 114 typically includes a pre-defined pattern, such as the dot array shown in the amplified view of target 114. Capturing images of calibration target 114 allows 3D machine-vision module 104 to determine the exact location of gripper 112. FIG. 1 also shows the Cartesian coordinate system used by 3D machine-vision system 104 to track the pose of robotic arm 102. This coordinate system is referred to as the camera coordinate system or camera-centered coordinate system. In the example shown in FIG. 1, the origin of the camera coordinate system is located at one of the cameras.

The robotic eye-to-hand coordination refers to the transformation of coordinates from the camera coordinate system to the robot-base coordinate system such that machine vision can be used to guide the movements of the robotic arm. The transformation between the coordinate systems can be expressed as:

$$\vec{V}_r = {}^bH_c \vec{V}_c, \quad (1)$$

where ${}^bH_c$ is the transformation matrix, $\vec{V}_r$ is a vector in the robot-base space (i.e., it is represented using coordinates in the robot-base coordinate system), $\vec{V}_c$ is the vector in camera space (i.e., it is represented using coordinates in the camera coordinate system). Equation (1) can be expanded by expressing each vector using its X, Y, and Z components to obtain:

$$\begin{bmatrix} X_r \\ Y_r \\ Z_r \\ 1 \end{bmatrix} = \begin{bmatrix} R_{11} & R_{12} & R_{13} & T_x \\ R_{21} & R_{22} & R_{23} & T_y \\ R_{31} & R_{32} & R_{33} & T_z \\ 0 & 0 & 0 & 1 \end{bmatrix} \begin{bmatrix} X_c \\ Y_c \\ Z_c \\ 1 \end{bmatrix}, \quad (2)$$

where $X_c$, $Y_c$, $Z_c$ are coordinates in the camera space; $X_r$, $Y_r$, $Z_r$ are the coordinates in the robot-base space; $R_{ij}$ are the rotational coefficients, i=1, 2, 3 and j=1,2,3; and $T_x$, $T_y$, $T_z$ are the translational coefficients.

One can obtain transformation matrix ${}^bH_c$ by performing an eye-to-hand calibration process. During the calibration process, a user can securely mount the robotic arm and the cameras of the 3D machine-vision system and then attach a calibration target (e.g., target 114 shown in FIG. 1) to an end-effector g of the robotic arm. The robotic arm can move end-effector g to a number of planned poses within the field of view (FOV) of the cameras. The robotic controller records the poses of end-effector g with respect to the robot base (i.e., with respect to the origin of the robot-base coordinate system) as ${}^bH_g$, and the 3D machine-vision system records the pose of the calibration target with respect to the camera (i.e., with respect to the origin of the camera coordinate system) as ${}^cH_t$. The poses in the robot-base space and the camera space satisfy the following equation:

$${}^{g(i)}H_b {}^bH_c {}^cH_{t(i)} = {}^{g(j)}H_b {}^bH_c {}^cH_{t(j)}, \quad (3)$$

where i and j correspond to poses, ${}^{g(i)}H_b$ and ${}^{g(j)}H_b$ are poses of the robot base with respect to end-effector g (with ${}^{g(i)}H_b = [{}^bH_{g(i)}]^{-1}$ and ${}^{g(j)}H_b = [{}^bH_{g(j)}]^{-1}$; ${}^cH_{t(i)}$ and ${}^cH_{t(j)}$ are poses of the calibration target with respect to the origin in the camera space, and ${}^bH_c$ is the camera pose with respect to the origin of the robot-base space, which is in fact the transformation matrix from the camera space to the robot-base space. In other words, knowing $^b H_c$, one can convert the camera-viewed pose of the target to the robot-controller-controlled pose of end-effector g. One can rearrange equation (3) to obtain:

$$[g^{(j)}H_b]^{-1}g^{(i)}H_b{}^bH_c = {}^bH_c{}^cH_{t(j)}[{}^cH_{t(i)}]^{-1} \quad (4)$$

Various numerical approaches have been developed to solve equation (4) in order to derive the transformation matrix ($^bH_c$). It has been proved that at least three poses (or two pairs of poses) are required to solve equation (4). Linear least squares technique or Singular Vector Decomposition (SVD) can be used to derive the transformation matrix. Lie theory can also be used to derive the transformation matrix by minimizing the distance metric on the Euclidean group. More specifically, a least square fitting can be introduced to obtain the solution for the transformation matrix using the canonical coordinates for Lie groups. Additional approaches can include using quaternion and non-linear minimization to improve the robustness of the solution, using Kronecker product and vectorization to improve the robustness in case of small rotation angles, and implementing dual quaternion and simultaneous solution for rotation and translation using SVD to improve the accuracy of the transformation matrix.

Although the above approaches have been shown to improve the accuracy of the transformation matrix, due to the non-linearity of kinematics and the inherent nature of numerical computations, there can still be errors. Moreover, input data from the robotic controller and cameras may also include errors, which can cause inevitable errors in the transformation matrix. For example, errors in rotational coefficients $\Delta R_{ij}$ are above $10^{-3}$ in current robotic systems. Errors in the transformation matrix can lead to positioning/pose errors of the robot.

To improve the positioning/pose accuracy, it is desirable to have the ability to correct the errors in the transformation matrix in real time. Multiple approaches have been attempted to correct the positioning and pose errors, including machine learning based approaches. For example, one approach trains a neural network to obtain eye-to-hand coordination in place of the transformation matrix, and another similar approach applies neural networks to eye-to-hand coordination in place of the transformation matrix and to eye-to-joint coordination instead of inverse kinematics. However, these approaches may still result in positioning accuracy in the multi-millimeter range. Another approach constructs a special neural network to predict positioning errors and compensates for the errors along a prescribed end-effector path. Although such an approach can reduce the positioning errors to less than one milliliter after compensation, it does not address issues associated with the pose errors. In general, existing robotic systems cannot meet the accuracy and repeatability requirements of manufacturing consumer electronics (e.g., smartphones, tablet computers, wearable devices, etc.). Assembling consumer electronics often involves handling many small (e.g., in the range of millimeters or less) components in a confined space and requires robot positioning/pose accuracy to the sub-millimeter range and beyond (sometimes as low as $10^{-3}$ mm).

To reduce positioning/pose errors of a working robot in its entire working space in real time, the concept of an error matrix can be introduced. The error matrix can indicate the difference between a controller-desired pose (i.e., the pose programmed by the robotic controller) of the robot end-effector and the actual pose of the end-effector (which can be captured by the cameras and converted from the camera space to the robot-base space using the transformation matrix) and can vary as the position of the end-effector changes in the working space. In some embodiments, the error matrix can be expressed as the transformation from the instructed pose to the desired pose in the robot-base space:

$$H_{td} = E(\vec{r}) \times H_{ti} \quad (5)$$

where $H_{td}$ is the controller-desired pose (or desired pose in short) of the tool center position (TCP) in the robot-base space, $H_{ti}$ is the actual pose converted from the camera space to the robot-base space using the transformation matrix and is referred to as the camera-instructed pose (or instructed pose in short), and $E(\vec{r})$ is the error matrix, which is a function of position vector $\vec{r}$. In one example, the robotic controller may send a command to move the end-effector to desired TCP pose $H_{td}$. However, due to errors (e.g., errors in the actuation of the joints and end-effector) in the robotic system, when the controller instructs the robotic arm to achieve this pose, the resulting pose is often different from $H_{td}$. The actual pose of the end-effector measured by the 3D machine-vision module and transformed from the camera space to the robot-base space can be instructed pose $H_{ti}$. Hence, given an instructed pose (i.e., a pose known to the camera), if error matrix $E(\vec{r})$ is known, one can compute the desired pose that can be used by the controller to instruct the robotic arm to move the end-effector to the instructed pose, thus achieving the eye (camera)-to-hand (robotic controller) coordination.

Real-Time Error Detection and Compensation

Although it is possible to derive $E(\vec{r})$, such a task can be computationally intensive, given that the robot can have six degrees of freedom (6DoF) (meaning that the TCP pose can include at least six components) and that the error matrix is a none-linear function of the position. A TCP pose can be expressed as [x, y, z, $r_x$, $r_y$, $r_z$], where [x, y, z] are the translational components and [$r_x$, $r_y$, $r_z$] are the rotational (e.g., roll, pitch, and yaw) components of the pose. Moreover, the non-linear nature of the errors also means that the error matrix may have unlimited dimensions. To reduce the amount of computation needed for deriving error matrix $E(\vec{r})$, in some embodiments of the instant application, a machine learning technique can be used, where a trained machine learning model (e.g., a neural network) can be used to learn the error matrix. When the error matrix is learned, the system can compute the instructed TCP pose for achieving the desired TCP pose. The robotic controller can then send the appropriate pose commands to the robotic arm.

In some embodiments, the error-detection machine learning model can include a neural network (e.g., a deep-learning neural network). The input of the model can be instructed pose $H_{ti}$, and the output of the model can be error matrix $E(\vec{r})$. In other words, given the instructed pose, the model can predict the error, and the desired pose can then be computed using equation (5). The controller can use the desired pose to control movements of the robot. The neural network can be constructed to include an embedding layer (which can be used to map discrete variables (e.g., TCP poses) as continuous vectors) and a processing layer. In some embodiments, to reduce embedding complexity and to increase efficiency, the translation components (i.e., [x, y, z]) and the rotational components (i.e., [$r_x$, $r_y$, $r_z$]) can be embedded separately (e.g., using two parallel embedding layers).

Figure 2:
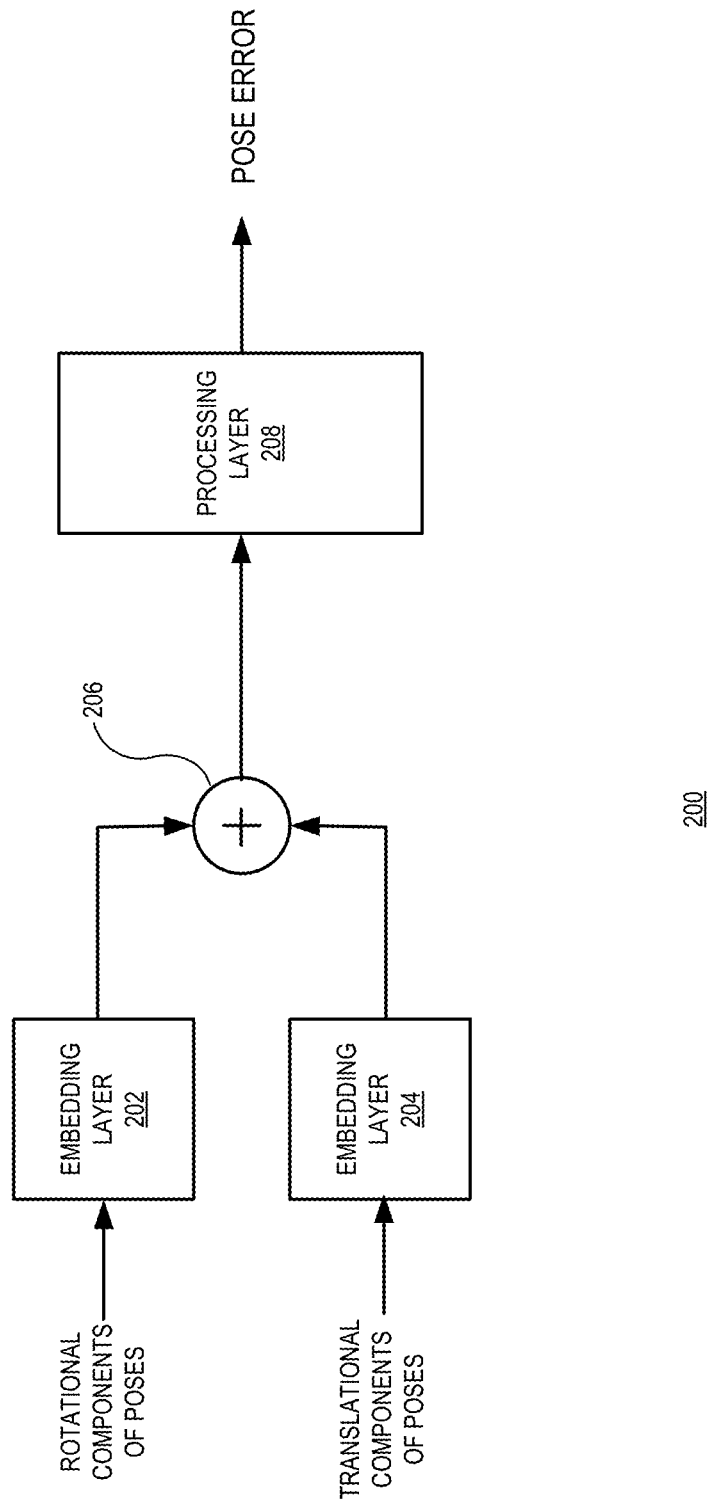
FIG. 2 illustrates an exemplary pose-error-detection neural network, according to one embodiment.

FIG. 2 illustrates an exemplary pose-error-detection neural network, according to one embodiment. A neural network 200 can include embedding layers 202 and 204, a concatenation module 206, and a processing layer 208. Embedding layer 202 can be used to embed the rotational components of the poses, and embedding layer 204 can be used to embed the translational components of the poses. Note that depending on the actual application, a pose inputted to the neural network 200 can be a desired pose or an instructed pose. For example, if the application is to compute the desired pose based on an instructed pose, the instructed pose is used as the input. On the other hand, if the application is to determine the instructed pose for a given desired pose, the desired pose will be used as the input. In the above two cases, the definition of the error matrix may be different. Nevertheless, the error matrix indicates the transformation between the desired pose and the instructed pose. Concatenation module 206 can be used to concatenate the embeddings of the translational components and the rotational components to obtain the embedding of the poses. In some embodiments, each embedding layer (layer 202 or 204) can be implemented using a multi-layered perceptron (MLP), which can include multiple internal layers (e.g., an input layer, a hidden layer, and an output layer). In further embodiments, each embedding layer can use Rectified Linear Unit (ReLU) as the activation function at each node. In addition to the ReLU, other types of activation function, such as a non-linear activation function can also be used by the embedding layers.

The concatenated embeddings can be sent to processing layer 208, which learns the mapping between the poses and the error matrix. In some embodiments, processing layer 208 can also be implemented using an MLP, and at each node of processing layer 208, leaky ReLU can be used as the activation function. In addition to the leaky ReLU, other types of activation function, such as a non-linear activation function can also be used by processing layer 208.

Figure 3:
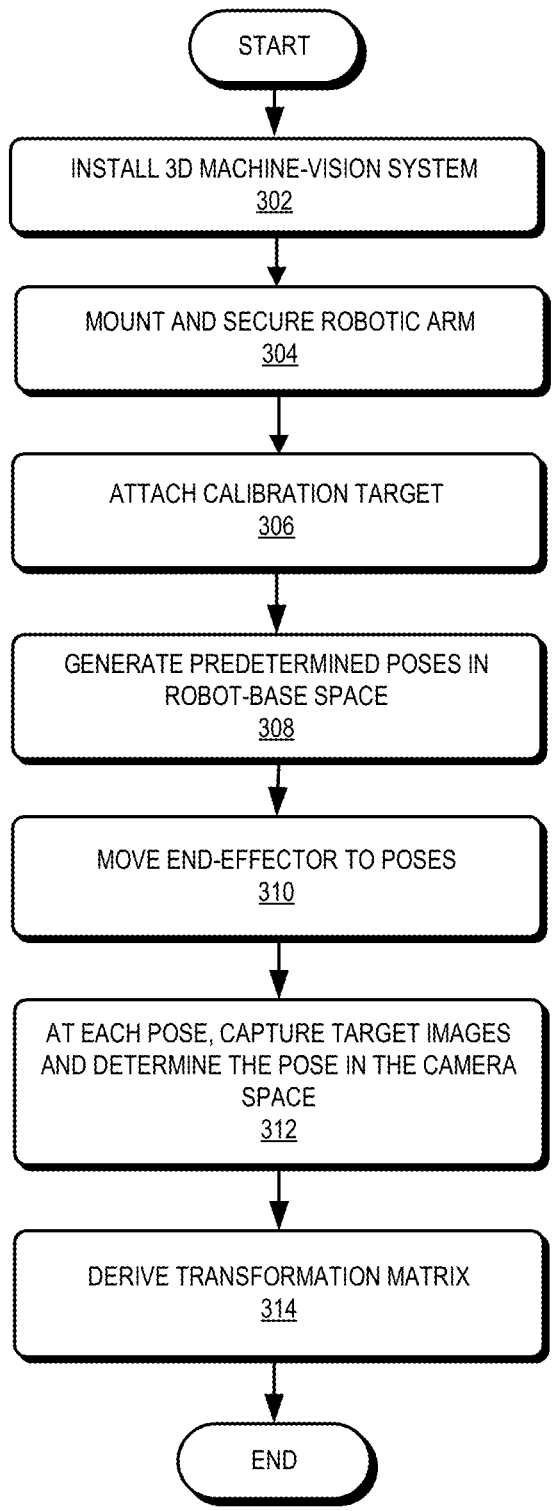
FIG. 3 presents a flowchart illustrating an exemplary process for calibrating the robotic system and obtaining the transformation matrix, according to one embodiment.

Before training the pose-error-detection neural network, the system needs to be calibrated, and the transformation matrix needs to be derived. Even though the derived transformation matrix most likely contains errors, such errors will be accounted for and corrected by the error matrix learned by the neural network. FIG. 3 presents a flowchart illustrating an exemplary process for calibrating the robotic system and obtaining the transformation matrix, according to one embodiment. During operation, the 3D machine-vision system is installed (operation 302). The 3D machine-vision system can include multiple cameras and a structured-light projector. The 3D machine-vision system can be mounted and secured above the end-effector of the robotic arm being calibrated, with the lenses of the cameras and the structured-light projector facing the end-effector of the robotic arm. The robot operator can mount and secure the 6-axis robotic arm, so that the robotic arm's end-effector can move freely to all possible poses within the FOV and depth of view (DOV) of the 3D machine-vision system (operation 304).

For calibration purposes, a calibration target (e.g., target 114 shown in FIG. 1) can be attached to the end-effector (operation 306). The predetermined pattern on the calibration target can facilitate the 3D machine-vision system in determining the pose (which includes not only the location but also the tilt angle) of the end-effector. The surface area of the calibration target is smaller than the FOV of the 3D machine-vision system.

The controller of the robotic arm can generate a number of predetermined poses in the robot-base space (operation 308) and sequentially move the end-effector to those poses (operation 310). At each pose, the 3D machine-vision system can capture images of the calibration target and determine the pose of the calibration target in the camera space (operation 312). The transformation matrix can then be derived based on poses generated in the robot-base space and the machine-vision-determined poses in the camera space (operation 314). Various techniques can be used to determine the transformation matrix. For example, equation (4) can be solved based on the predetermined poses in the robot-base space and the camera space using various techniques, including but not limited to: linear least square or SVD techniques, Lie-theory-based techniques, techniques based on quaternion and non-linear minimization or dual quaternion, techniques based on Kronecker product and vectorization, etc.

Figure 4:
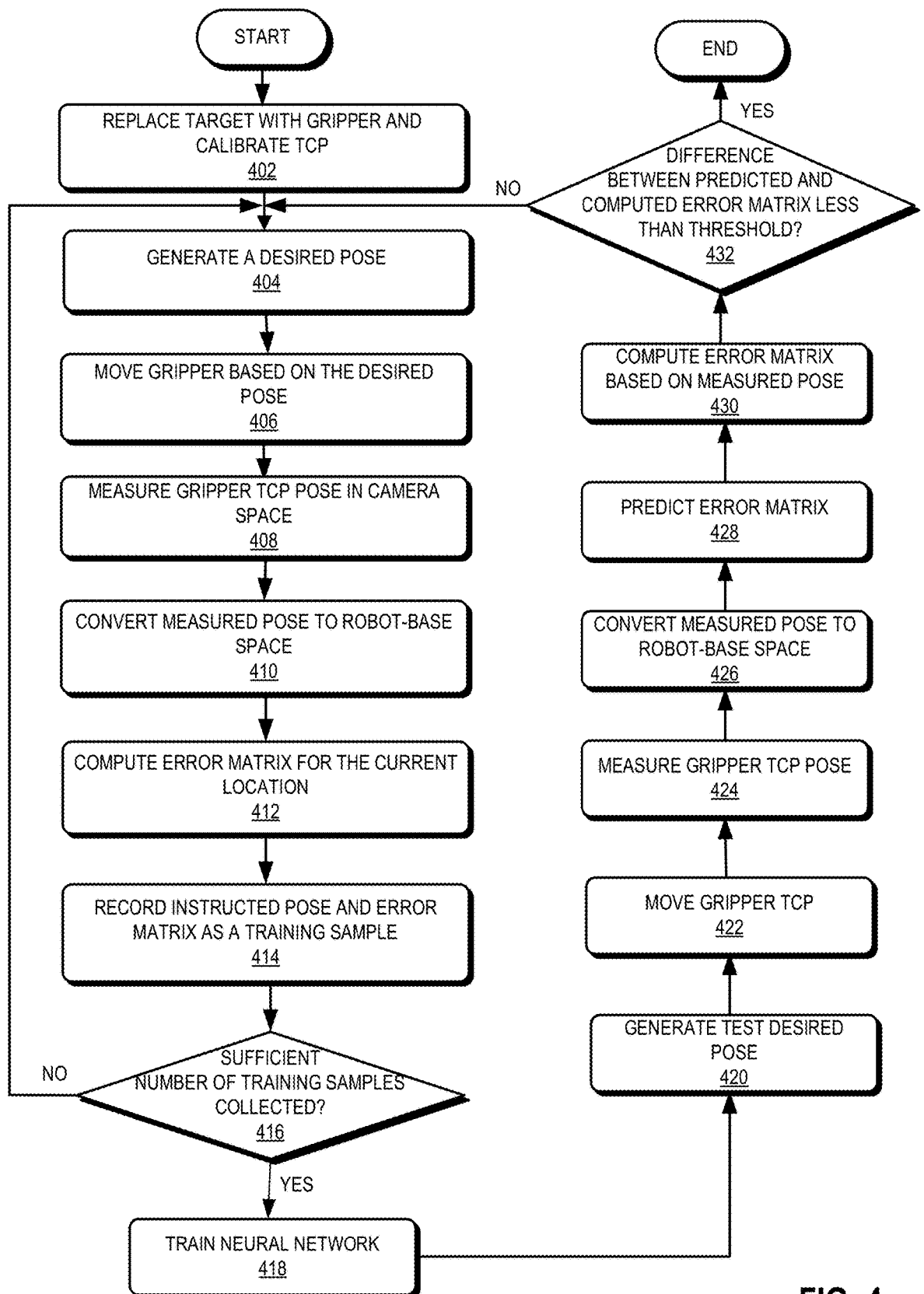
FIG. 4 presents a flowchart illustrating an exemplary process for training the pose-error-detection neural network, according to one embodiment.

FIG. 4 presents a flowchart illustrating an exemplary process for training the pose-error-detection neural network, according to one embodiment. In some embodiments, the training of the neural network can include a supervised training process. During training, the robot operator can replace the calibration target with a gripper and calibrate the tool center point (TCP) of the gripper (operation 402). The controller of the robotic arm can generate a desired pose within the working space of the robotic arm or within the FOV and DOV of the 3D machine-vision system (operation 404). The desired pose can be generated randomly or following a predetermined path. In some embodiments, the working space can be divided into a 3D grid having a predetermined number of cells, and the controller can generate one instructed pose for each cell. This can ensure that the training can cover a sufficient portion of the working space. The robotic controller can then move the gripper based on the desired poses (operation 406). For example, the robotic controller can generate motion commands based on a desired pose and send the motion commands to the various motors on the robotic arm in order to adjust the TCP pose of the gripper. In alternative embodiments, instead of having the controller generate a random pose, the end-effector can be moved to a random pose, and the desired pose of the gripper TCP can be determined by reading values of the encoders of the robotic arm.

After the movement of the gripper stops, the 3D machine-vision module can measure the pose of the gripper TCP (operation 408). Due to the high accuracy of the 3D machine-vision, the measured pose can be considered the actual pose of the gripper. In other words, any measurement error from the 3D machine-vision module can be considered insignificant and ignored. Note that the measurement output of the 3D machine-vision module can be in the camera space. The measured pose in the camera space can then be converted to a measured pose in the robot-base space using the previously determined transformation matrix to obtain the instructed pose (operation 410). Based on the measured pose in the robot-base space and the desired pose (which is also in the robot-base space), error matrix $E(\vec{r})$ for the current location ($\vec{r}$) can be computed (operation 412). For example, the error matrix can be computed as $E(\vec{r}) = H_{td} \times H_{ti}^{-1}$, where $H_{ti}$ is the instructed pose and $H_{td}$ the desired pose. The system can record $H_{ti}$ and $E(\vec{r})$ as a training sample (operation 414) and determine whether a predetermined number of training samples has been collected (operation 416). If so, the collected samples, including the ($H_{ti}$, $E(\vec{r})$) pairs at the different locations can be used to train the pose-error-detection neural network (operation 418); if not, the controller can generate an additional pose (operation 404). In one embodiment, the system may also collect multiple pose samples at a single location.

In some embodiments, the training of the neural network can stop when a sufficient portion of the working space (e.g., 50%) has been covered. For example, if the working space has been divided into a 3D grid of 1000 cells, and over 50% of cells have been randomly selected for training (i.e., the robotic arm has been moved to these cells and training samples collected), then the training can be stopped. In alternative embodiments, the training of the neural network can stop after the neural network can predict/detect error with an accuracy above a predetermined threshold level. In such a case, after the initial training at operation 418, the controller can generate a test desired pose (operation 420) and move the TCP of the gripper according to the test desired pose (operation 422). The 3D machine-vision module measures the pose of the gripper TCP in the camera space (operation 424). The measured pose in the camera space can be converted to the robot-base space using the transformation matrix to obtain a test instructed pose (operation 426). The neural network can predict/infer an error matrix corresponding to the test instructed pose (operation 428). In addition, the system can compute an error matrix using the test desired pose and the test instructed pose (operation 430). The predicted error matrix and the computed error matrix can be compared to determine whether the difference is smaller than a predetermined threshold (operation 432). If so, the training is completed. If not, additional training samples are to be collected by going back to operation 404. The threshold can vary depending on the positioning accuracy needed for the robotic operation.

Once the pose-error-detection neural network is sufficiently trained, the robotic system can operate with real-time error correction capability. For example, for any instructed pose in the working space of the robotic arm, the system can infer/predict a corresponding error matrix using the neural network and then determine the desired pose of the gripper by multiplying the inferred error matrix with the instructed pose. In one example, the instructed pose of the gripper can be obtained by measuring, using the 3D machine-vision module, the pose of a to-be-assembled component in the working space. Hence, by generating commands based on desired pose $H_{td}$, the robotic controller can move the gripper to $H_{ti}$ to be aligned with the component, thereby facilitating the gripper in grasping the component.

Figure 5A:
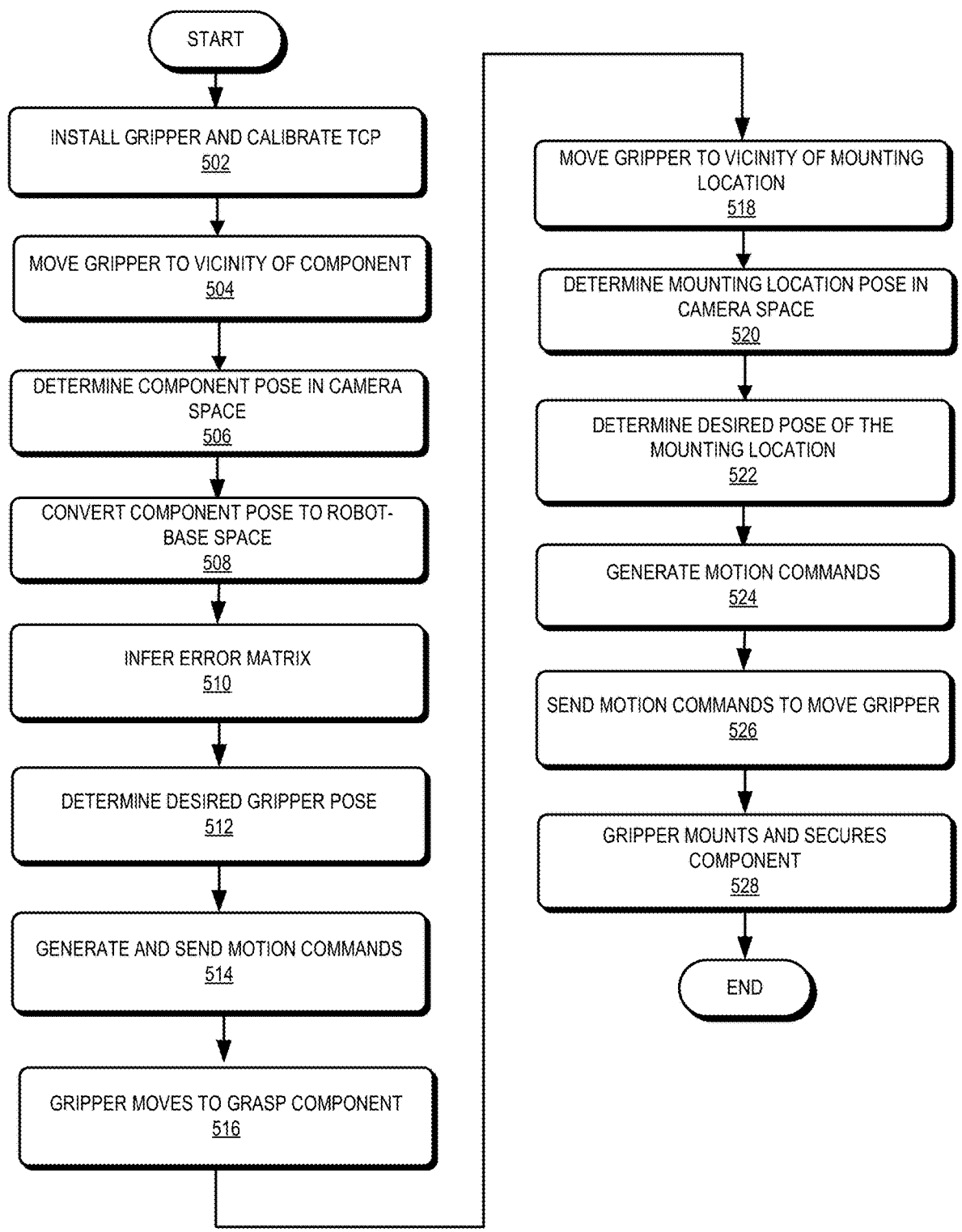
FIG. 5A presents a flowchart illustrating an exemplary operation process of the robotic system, according to one embodiment.

FIG. 5A presents a flowchart illustrating an exemplary operation process of the robotic system, according to one embodiment. The robotic system can include the robotic arm and the 3D machine-vision system. During operation, an operator can install a gripper on the robotic arm and calibrate its TCP (operation 502). The robotic controller can move the gripper to the vicinity of a to-be-assembled component in the working space under the guidance of the 3D machine-vision system (operation 504). At this stage, the 3D machine-vision system may generate low-resolution images (e.g., using cameras with a large FOC) to guide the movement of the gripper.

The 3D machine-vision system can determine the pose of the component in the camera space (operation 506) and then convert the component pose from the camera space to the robot-base space using the transformation matrix (operation 508). In this example, it is assumed that the TCP pose of the gripper should be aligned with the component to facilitate the gripper picking up the component. Hence, the converted component pose can be the instructed pose of the gripper TCP. The pose-error-detection-and-compensation system can then use the neural network to infer the error matrix for the instructed pose (operation 510). Based on the instructed pose and the error matrix, the pose-error-detection-and-compensation system can determine the desired pose of the gripper such that the gripper can successfully grasp the component at the desired pose (operation 512). For example, the desired pose can be computed by multiplying the instructed pose with the predicted error matrix. The robotic controller can generate motion commands based on the desired pose and send the motion commands to the robotic arm (operation 514). The gripper moves accordingly to grasp the component (operation 516).

When the gripper securely grasps the component, the robotic controller can move the gripper with the component to the vicinity of a mounting location for the component under the guidance of the 3D machine-vision system (518). As in operation 504, the 3D machine-vision system can operate at low resolution in operation 518. The 3D machine-vision system can determine the pose of the mounting location in the camera space (operation 520). For example, if the grasped component is to mate with another component, the 3D machine-vision system can determine the pose of the other component. The pose-error-detection-and-compensation system can similarly determine the desired pose of the mounting location (operation 522). For example, the 3D machine-vision system can measure the pose of the mounting location in the camera space, and the pose-error-detection-and-compensation system can convert the measured pose in the camera space to a measured pose in the robot-base space and then apply the error matrix to obtain the desired pose of the mounting location.

Provided with the desired pose, the robotic controller can generate motion commands (operation 524) and send the motion commands to the robotic arm in order to move the gripper to align with the mounting location (operation 526). The gripper can then mount and secure the component at the mounting location (operation 528).

The system can accurately infer/predict an error matrix for any possible pose of the gripper within the working space, thereby significantly increasing the operation accuracy of the robot and reducing the amount of time needed for adjusting the robot movements. In addition, the pose-error-detection neural network can be continuously trained by collecting additional samples to improve its accuracy or to recalibrate. For example, after each robot movement, the 3D machine-vision system may measure and record the actual pose of the gripper, and such measurement can be used to generate additional training samples. In some embodiments, the training process (e.g., the process shown in FIG. 4) can be performed periodically or as needed. For example, if the pose error beyond a predetermined threshold is detected during the normal operation of the robotic system, the operation can be halted, and the neural network can be retrained.

In certain cases, the robotic arm needs to pick up and mount a flexible component. For example, the robotic arm may pick up an RF cable, align the cable connector to a socket, and insert the cable connector into the socket. Because cables are flexible, each time the end-effector/gripper of the robotic arm grasps a cable, the relative position of the end-effector and the cable can vary. Moreover, the curvature of the cable may change in midair, making it difficult to align the cable connector to the socket, even with the error-compensation effort. The mere control of the pose of the end-effector can be insufficient to accomplish the task of mounting or connecting the cable.

Figure 5B:
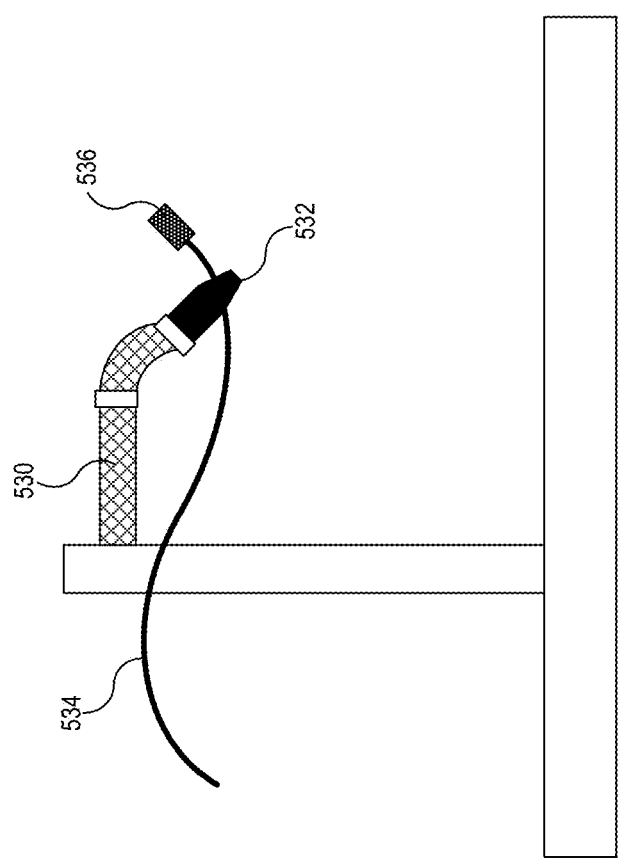
FIG. 5B illustrates a scenario where a flex cable is picked up by the end-effector of a robotic arm, according to one embodiment.

FIG. 5B illustrates a scenario where a flex cable is picked up by the end-effector of a robotic arm, according to one embodiment. In FIG. 5B, end-effector 532 of robotic arm 530 picks up a flexible cable 534. The goal of end-effector 532 is to move cable 534 to a desired location such that connector 536 at the end of cable 534 can mate with a corresponding connector. Due to the flexible nature of cable 534, simply controlling the pose of end-effector 532 may not guarantee success of this cable-connection task. However, the pose of connector 536 can be correlated to the pose of end-effector 532, and determining the desired pose of connector 536 may facilitate the determination of the desired pose of end-effector 532.

In some embodiments, the system can use an additional transformation matrix to extend the TCP form the tip of the end-effector to the center of the connector, such that the controller-desired pose can be referenced to the center of the RF connector. This additional transformation matrix can be referred to as a component-transformation matrix $T_c$, which transforms/correlates the pose of a component to the pose of the end-effector (both poses have been converted to the robot-base space) holding the component. More specifically, given the pose of the end-effector $H_e$, the component pose $H_c$ can be computed using:

$$H_c = T_c \times H_e \tag{6}$$

The component-transformation matrix can be determined in real time. During the operation of the robotic arm, the poses of the end-effector and the component (i.e., end-effector 532 and connector 536 shown in FIG. 5) can be determined using the 3D machine vision system, and the component-transformation matrix can then be computed using:

$$T_c = H_c \times H_e^{-1} \tag{7}$$

With the TCP extended to the component, the controller-desired pose can be computed as:

$$H_{td} = E(\vec{r}) \times T_c^{-1} \times H_{ci}, \tag{8}$$

where $H_{td}$ is the controller-desired pose of the end-effector, and $H_{ci}$ is the camera-instructed pose of the component. In other words, once the camera determines the target pose of the component, the system can compute the controller-desired pose that can be used to generate motion commands to move the end-effector such that the component can be moved to its target pose. In some embodiments, to ensure accuracy, the system can repeatedly (e.g., in short intervals) measure and compute the component-transformation matrix, such that even the component may move with respect to the end-effector, such change in the relative pose can be captured. For example, the system can compute $T_c$ at every 300 ms. The most recent $T_c$ will be used to compute the controller-desired pose.

Figure 6:
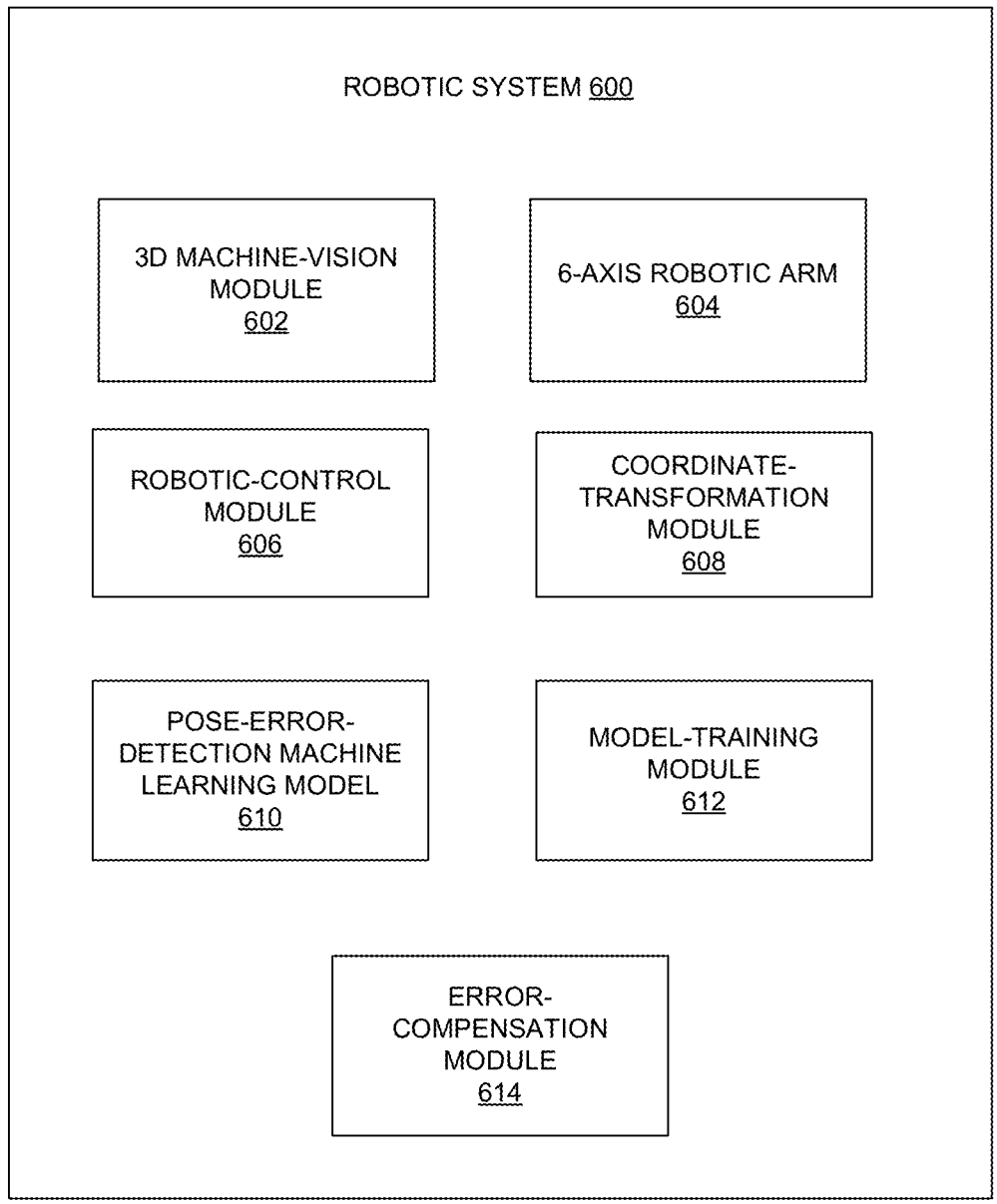
FIG. 6 shows a block diagram of an exemplary robotic system, according to one embodiment.

FIG. 6 shows a block diagram of an exemplary robotic system, according to one embodiment. Robotic system 600 can include a 3D machine-vision module 602, a six-axis robotic arm 604, a robotic-control module 606, a coordinate-transformation module 608, a pose-error-detection machine learning model 610, a model-training module 612, and an error-compensation module 614.

3D machine-vision module 602 can use 3D machine-vision techniques (e.g., capturing images under structured-light illumination, constructing 3D point cloud, etc.) to determine the 3D pose of objects (including both to-be-assembled components and the gripper) within the FOV and DOV of the cameras. In some embodiments, 3D machine-vision module 602 can include multiple cameras having different FOVs and DOVs and one or more structured-light projector.

Six-axis robotic arm 604 can have multiple joints and 6DoF. The end-effector of six-axis robotic arm 604 can move freely in the FOV and DOV of the cameras of 3D machine-vision module 602. In some embodiments, robotic arm 604 can include multiple sections, with adjacent sections coupled to each other via a rotational joint. Each rotational joint can include a servo motor capable of continuous rotation within a particular plane. The combination of the multiple rotational joints can enable robotic arm 604 to have an extensive range of movement with 6DoF.

Robotic-control module 606 controls the movements of robotic arm 604. Robotic-control module 606 can generate a motion plan, which can include a sequence of motion commands that can be sent to each individual motor in robotic arm 604 to facilitate movements of a gripper to accomplish particular assembling tasks, such as picking up a component, moving the component to a desired mounting location, and mounting the component. Due to errors included in the system (e.g., encoder errors at each motor), when robotic-control module 606 instructs the gripper to move to one pose, the gripper may end up moving to a slightly different pose. Such positioning errors may be compensated for.

Coordinate-transformation module 608 can be responsible for converting the pose of the gripper from the camera space to the robot-base space. Coordinate-transformation module 608 can maintain a transformation matrix and use the transformation matrix to transform or correlate a pose observed by 3D machine-vision module 602 in the camera space to a pose in the robot-base space. The transformation matrix can be obtained through a calibration process that measures multiple poses of a calibration target. Errors contained in the transformation matrix can be accounted for and compensated for by an error matrix. In further embodiments, coordinate-transformation module 608 can further maintain a component-transformation matrix that can correlate the pose of a component (e.g., the end of a flexible cable) held by the end-effector to the pose of the end-effector.

Pose-error-detection machine learning model 610 applies a machine learning technique to learn the error matrix for all poses in the working space of robotic arm 604. In some embodiments, pose-error-detection machine learning model 610 can include a neural network that can take as input a pose instructed/viewed by 3D machine-vision module 602 and output an error matrix that can be used to compute a desired pose of the robotic controller to achieve the camera-viewed/instructed pose. The neural network can include an embedding layer and a processing layer, with both layers implemented using MLP. The embedding of rotational and translational components of the poses can be done separately, and the embedding results are concatenated before being sent to the processing layer. The activation function used in the embedding layer comprises ReLU, whereas leaky ReLU is used as the activation function in the processing layer. Model-training module 612 trains the neural network through, for example, supervised training. More specifically, model-training module 612 collects training samples by instructing robotic-control module 606 to generate poses and then computes error matrices for those poses.

Error-compensation module 614 can compensate for the pose errors. To do so, for a desired pose, error-compensation module 614 can obtain a corresponding error matrix by applying pose-error-detection machine learning model 610. Error-compensation module 614 can compensate for the pose error by computing the controller-desired pose for achieving the actual or camera-viewed/instructed pose. Error-compensation module 614 can send the controller-desired pose to robotic-control module 606 to allow it to generate appropriate motion commands in order to move the gripper to the desired pose.

Figure 7:
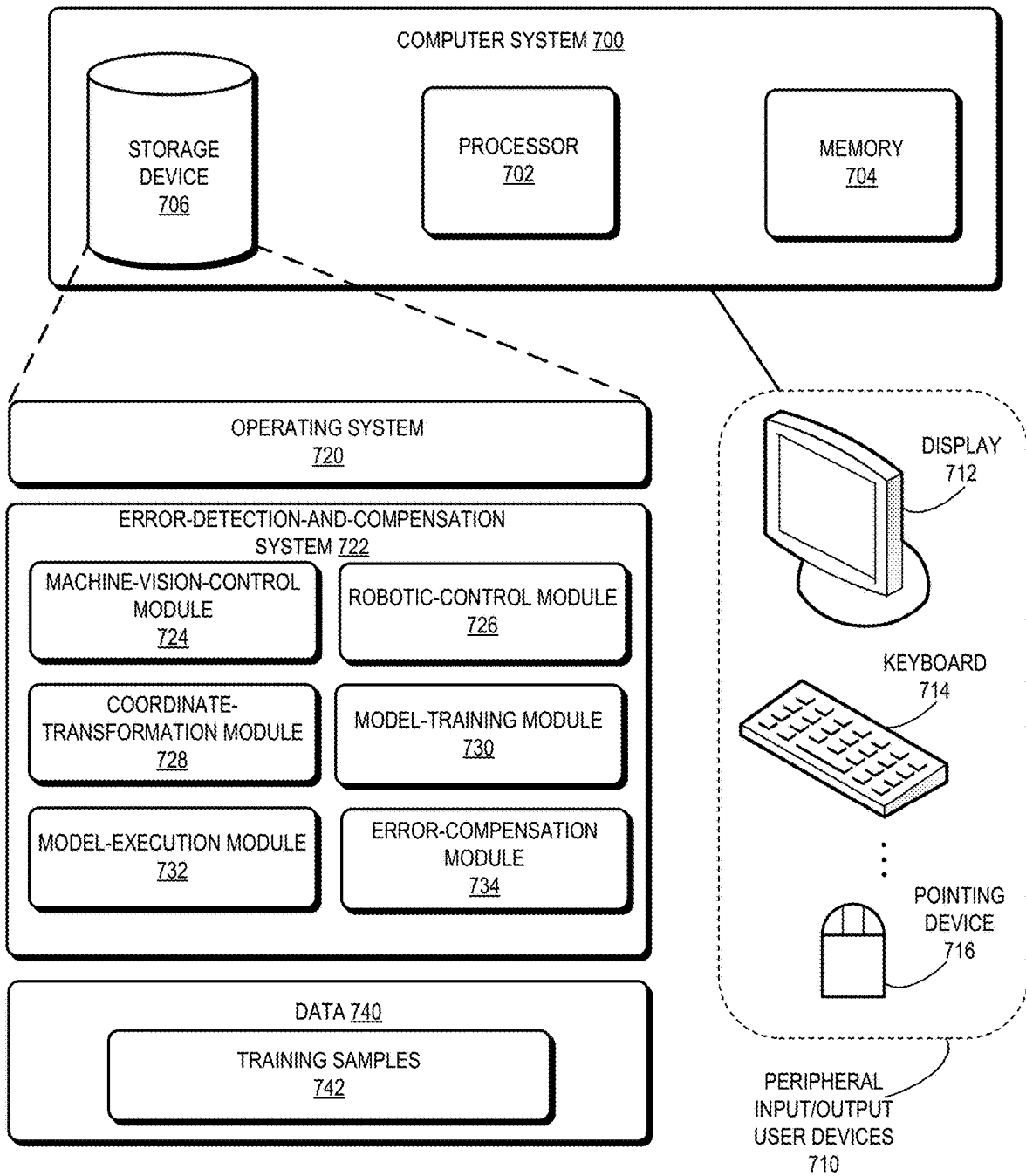
FIG. 7 illustrates an exemplary computer system that facilitates error detection and compensation in a robotic system, according to one embodiment.

FIG. 7 illustrates an exemplary computer system that facilitates error detection and compensation in a robotic system, according to one embodiment. Computer system 700 includes a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 720, an error-detection-and-compensation system 722, and data 740.

Error-detection-and-compensation system 722 can include instructions, which when executed by computer system 700, can cause computer system 700 or processor 702 to perform methods and/or processes described in this disclosure. Specifically, error-detection-and-compensation system 722 can include instructions for controlling a 3D machine-vision module to measure actual poses of the gripper (machine-vision-control module 724), instructions for controlling movements of the robotic arm in order to place the gripper in a particular pose (robotic-control module 726), instructions for transforming poses from the camera space to the robot-base space (coordinate-transformation module 728), instructions for training a pose-error-detection machine learning model (model-training module 730), instructions for executing the machine learning model, during operations of the robotic arm, to infer an error matrix associated with a pose (model-execution module 732), and instructions for compensating for the errors based on the inferred error matrix (error-compensation module 734). Data 740 can include collected training samples 742.

In general, embodiments of the present invention can provide a system and method for detecting and compensating, in real time, for pose errors of a robotic system. The system can use machine learning techniques (e.g., training a neural network) to predict an error matrix that can transform a camera-viewed pose (i.e., the instructed pose) to a controller-controlled pose (i.e., the desired pose). Therefore, to align the gripper with a component in the camera view, the system can first obtain the camera-viewed pose of the component and then use the trained neural network to predict the error matrix. By multiplying the camera-viewed pose with the error matrix, the system can obtain the controller-controlled pose. The robotic controller can then use the controller-controlled pose to move the gripper to the desired pose.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A robotic system, the system comprising:
a machine-vision module;
a robotic arm comprising an end-effector;
a robotic controller configured to control movements of the robotic arm; and
an error-compensation module configured to compensate for pose errors of the robotic arm by determining a controller-desired pose corresponding to a camera-instructed pose of the end-effector such that, when the robotic controller controls the movements of the robotic arm based on the controller-desired pose, the end-effector achieves, as observed by the machine-vision module, the camera-instructed pose;
wherein the error-compensation module comprises a machine learning model configured to output an error matrix that correlates the camera-instructed pose to the controller-desired pose.

2. The robotic system of claim 1, wherein the machine learning model comprises a neural network.

3. The robotic system of claim 2, wherein the neural network comprises an embedding layer and a processing layer, and wherein each of the embedding and processing layers comprises a multi-layered perceptron.

4. The robotic system of claim 3, wherein the embedding layer is configured to embed separate translational components and rotational components of a pose.

5. The robotic system of claim 3, wherein the embedding layer uses Rectified Linear Unit (ReLU) as an activation function, and wherein the processing layer uses leaky ReLU as an activation function.

6. The robotic system of claim 2, further comprising a model-training module configured to train the neural network by collecting training samples, wherein while training the neural network, the model-training module is configured to:
cause the robotic controller to generate a controller-desired pose sample;
control movements of the robotic arm based on the controller-desired pose sample;
determine, using a machine-vision module, an actual pose of the end-effector; and
compute an error matrix based on the controller-desired pose sample and the actual pose.

7. The robotic system of claim 6, wherein the model-training module is configured to train the neural network until the error matrix produced by the machine learning model reaches a predetermined level of accuracy.

8. The robotic system of claim 1, further comprising a coordinate-transformation module configured to transform a pose determined by the machine-vision module from a camera-centered coordinate system to a robot-centered coordinate system.

9. The robotic system of claim 8, wherein the coordinate-transformation module is further configured to determine a transformation matrix based on a predetermined number of measured poses of a calibration target.

10. The robotic system of claim 8, wherein the coordinate-transformation module is further configured to correlate a pose of a component held by the end-effector to a corresponding pose of the end-effector.

11. A computer-implemented method, the method comprising:
   determining, by a machine-vision module, a camera-instructed pose of an end-effector of a robotic arm for accomplishing an assembly task;
   determining a controller-desired pose corresponding to the camera-instructed pose of the end-effector, which comprises applying a machine learning model to obtain an error matrix that correlates the camera-instructed pose to the controller-desired pose; and
   controlling, by a robotic controller, movements of the robotic arm based on the controller-desired pose, thereby facilitating the end-effector to achieve the camera-instructed pose in order to accomplish the assembly task.

12. The method of claim 11, wherein the machine learning model comprises a neural network, wherein the neural network comprises an embedding layer and a processing layer, and wherein each of the embedding and processing layers comprises a multi-layered perceptron.

13. The method of claim 12, wherein applying the machine learning model comprises embedding, by the embedding layer, translational components and rotational components of a pose separately.

14. The method of claim 12, wherein applying the machine learning model further comprises:
   implementing, at the embedding layer, Rectified Linear Unit (ReLU) as an activation function, and
   implementing, at the processing layer, leaky ReLU as an activation function.

15. The method of claim 12, further comprising training the neural network by collecting training samples, wherein collecting a respective training sample comprises:
   causing the robotic controller to generate a controller-desired pose sample;
   controlling movements of the robotic arm based on the controller-desired pose sample;
   determining, using a machine-vision module, an actual pose of the end-effector; and
   computing an error matrix based on the controller-desired pose sample and the actual pose.

16. The method of claim 11, further comprising determining a transformation matrix used for transforming a pose determined by a machine-vision module from a camera-centered coordinate system to a robot-centered coordinate system.

17. The method of claim 11, further comprising determining a component-transformation matrix used for transforming a pose of a component held by the end-effector to a corresponding pose of the end-effector.

18. A computer-implemented method, the method comprising:
   modeling pose errors associated with an end-effector of a robotic arm using a neural network;
   training the neural network using a plurality of training samples, wherein a respective training sample comprises a camera-instructed pose of the end-effector and a corresponding error matrix that correlates the camera-instructed pose to a controller-desired pose of the end-effector; and
   applying the trained neural network to compensate for the pose errors during operations of the robotic arm.

19. The computer-implemented method of claim 18, wherein the neural network comprises an embedding layer and a processing layer, and wherein each of the embedding and processing layers comprises a multi-layered perceptron.

20. The computer-implemented method of claim 19, wherein modeling the pose errors comprises embedding, by the embedding layer, translational components and rotational components of a pose separately.

21. The computer-implemented method of claim 19, wherein modeling the pose errors comprises:
   implementing, at the embedding layer, Rectified Linear Unit (ReLU) as an activation function, and
   implementing, at the processing layer, leaky ReLU as an activation function.

22. The computer-implemented method of claim 18, further comprising collecting the training samples, wherein collecting a respective training sample comprises:
   causing the robotic controller to generate a controller-desired pose sample;
   controlling movements of the robotic arm based on the controller-desired pose sample;
   determining, using a machine-vision module, an actual pose of the end-effector; and
   computing an error matrix based on the controller-desired pose sample and the actual pose.

* * * * *